United States Patent [19]

Clark et al.

[11] Patent Number: 4,978,410

[45] Date of Patent: * Dec. 18, 1990

[54] METHOD FOR JOINING OF PREFIRED OR FIRED CERAMICS USING SOL GELS

[75] Inventors: David E. Clark; Robert H. Krabill, both of Gainesville, Fla.

[73] Assignee: University of Florida, Gainesville, Fla.

[*] Notice: The portion of the term of this patent subsequent to Aug. 29, 2006 has been disclaimed.

[21] Appl. No.: 4,317

[22] Filed: Jan. 8, 1987

Related U.S. Application Data

[63] Continuation of Ser. No. 704,914, Feb. 25, 1985, abandoned.

[51] Int. Cl.[5] .................. C03B 29/00; C09J 1/00; C09J 5/06
[52] U.S. Cl. .................. 156/325; 106/692; 156/89; 252/315.7; 264/36
[58] Field of Search .............. 252/315.7; 264/36; 156/89, 325; 106/104

[56] References Cited

U.S. PATENT DOCUMENTS

| | | | |
|---|---|---|---|
| 2,085,129 | 6/1937 | Stoewener | 252/315.7 |
| 3,287,476 | 11/1966 | Snyder | 264/36 |
| 4,397,666 | 8/1983 | Mishima et al. | 264/301 |
| 4,861,410 | 8/1989 | Clark et al. | 156/325 |

FOREIGN PATENT DOCUMENTS

| | | | |
|---|---|---|---|
| 0102875 | 6/1984 | Japan | 106/104 |
| 0621655 | 8/1978 | U.S.S.R. | 106/104 |

OTHER PUBLICATIONS

Yoldas: "Alumina Gels That Form Porous Transparent $Al_2O_3$", *Journal of Materials Science*, vol. 10, No. 11, Nov. 1975, pp. 1856–1860.

*Primary Examiner*—Richard D. Lovering
*Attorney, Agent, or Firm*—Fleit, Jacobson, Cohn, Price, Holman & Stern

[57] ABSTRACT

A method of repairing a defect in or joining fired or unfired ceramic bodies by using a paste composed of a wet undried metal oxide gel consisting of $Al_2O_3$, $SiO_2$, $MgO$, $ZrO_2$, $Y_2O_3$, and mixtures thereof and joining the paste. A reinforcement material consisting of SiC, C, $SiO_2$, $Al_2O_3$, $ZrO_2$, $Y_2O_3$, MgO and mixtures thereof may be included in the paste.

4 Claims, 2 Drawing Sheets

METHOD FOR JOINING OF PREFIRED OR FIRED CERAMICS USING SOL GELS

This invention was made with Government support under F49620-83-C-0072 awarded by the Air Force. The Government has certain rights in this invention.

This application is a continuation of application Ser. No. 704,914, filed Feb. 25, 1985, now abandoned.

BACKGROUND OF THE INVENTION

1. Field of the Invention

The present invention relates to a novel method for repairing or joining prefired or fired ceramics using a wet undried gel containing the same metal oxide as the ceramic being treated, i.e., $Al_2O_3$.

2. Description of Prior Art

It is well known in ceramics that major defects which are present in a pre fired ceramic are not eliminated during firing to high temperatures. The most unusual course of action when such a defect is detected in the green ceramic is to either discard the material and absorb the cost, or to recycle the material if possible. Accordingly, a need exists to discover or develop a technique which can be used to salvage defective green bodies and thereby increase the yield of a production, and concomitantly, improve its economics.

The method of the present invention provides a solution to this problem by providing a novel process that eliminates the time consuming and costly procedures of discarding or recycling. The method of the present invention accomplishes this advantage by enabling defects in green bodies, in particular, or fired ceramics to be repaired or such articles to be joined in a simple easy manner that maintains the integrity of the final product.

SUMMARY OF THE INVENTION

The foregoing is accomplished by preparing a unique paste in the form of an undried gel of a metal oxide, such as $Al_2O_3$, which can be applied to a defect by spatula or injection, such as by a syringe, to correct the defect and save the green body, in the sense that it can be heat treated and an article will result which is usable.

DESCRIPTION OF PREFERRED EMBODIMENT

The preparation of $Al_2O_3$ gels is described in copending applications Ser. Nos. 583,737; 583,738; 583,743; and 583,745, each of said copending applications having been filed Feb. 27, 1983 and now abandoned, herein incorporated by reference. Using any one of the procedures described in these copending applications or any other known procedure, an $Al_2O_3$ gel is prepared but not dried. Using a spatula or any suitable tool, the wet, undried gel, which is a solid monolithic body, is mashed or otherwise worked with the spatula to form a paste.

In place of using $Al_2O_3$ gels, other materials which can be used include wet undried gels of $SiO_2$, MgO, $ZrO_2$, $Y_2O_3$ or mixtures of any of the foregoing including $Al_2O_3$. The preferred composition of the undried gel paste is the metal oxide composition that matches the metal oxide composition of the ceramic being treated.

Also, the wet undried gel paste can contain a reinforcement in the form of fibers, whiskers or powders of materials such as C, $SiO_2$, $Al_2O_3$, $ZrO_2$, MgO, SiC and mixtures thereof. The volume percent loading of the reinforcement can vary from 5 to 90 but 30 volume percent loading is preferred.

In a preferred example, an $Al_2O_3$ wet, undried gel containing 30 volume percent SiC was prepared following the procedures described in the aforementioned copending applications. The wet undried gel was mashed with a spatula and worked into a paste. An unfired test specimen 10, see FIG. 1, composed of dried $Al_2O_3$ gel containing SiC reinforcement was pulled apart and rejoined using the paste. The paste was applied to the broken ends 12 and 14 and coated over the broken ends. The two broken ends were pressed together manually and the rejoined parts heated above 30° C. to dry the paste. A good joint resulted.

Figure 1:
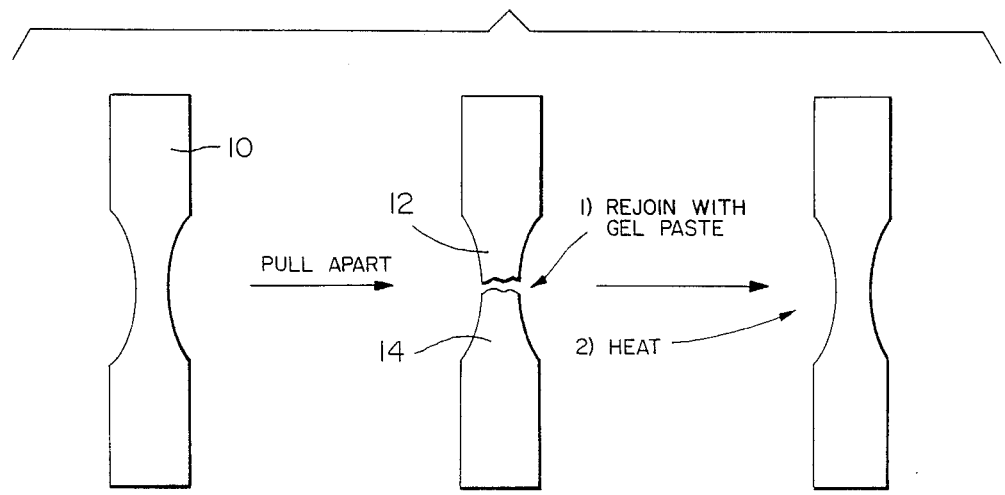
FIG. 1 shows schematically an unfired ceramic of $Al_2O_3$ (green body) test specimen pulled apart and rejoined using a wet undried gel paste of $Al_2O_3$.
Figure 2:
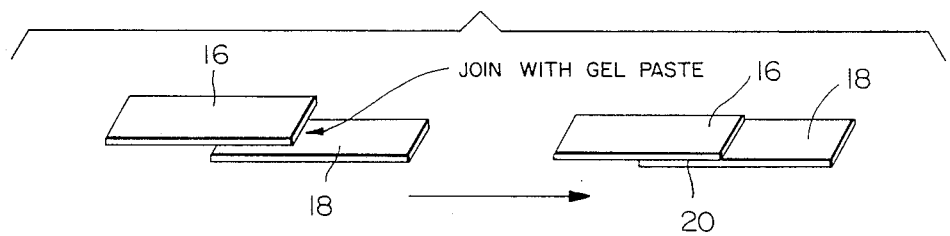
FIG. 2 shows schematically two bars of unfired $Al_2O_3$ joined or bonded using a wet, undried gel paste of $Al_2O_3$.

Two bars 16 and 18 were joined, see FIG. 2, using the same procedures as followed in FIG. 1 to produce an overlap joint 20. The bars 16 and 18 were unfired $Al_2O_3$ gels containing SiC reinforcement made as described in the copending applications. The paste was the same as used previously. A good joint resulted.

Figure 3:
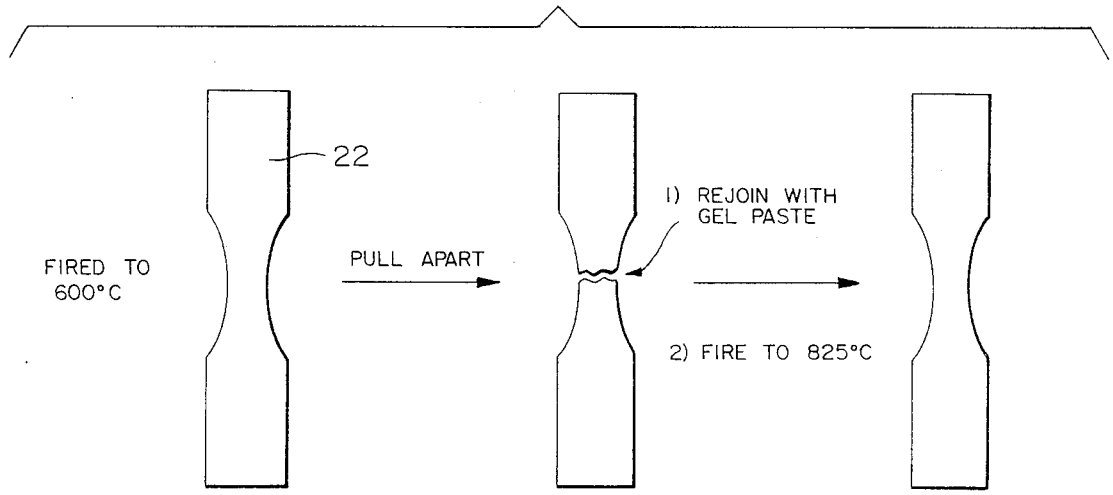
FIG. 3 shows schematically a fired $Al_2O_3$ test specimen pulled apart and rejoined using a wet undried gel paste of $Al_2O_3$.
Figure 4:
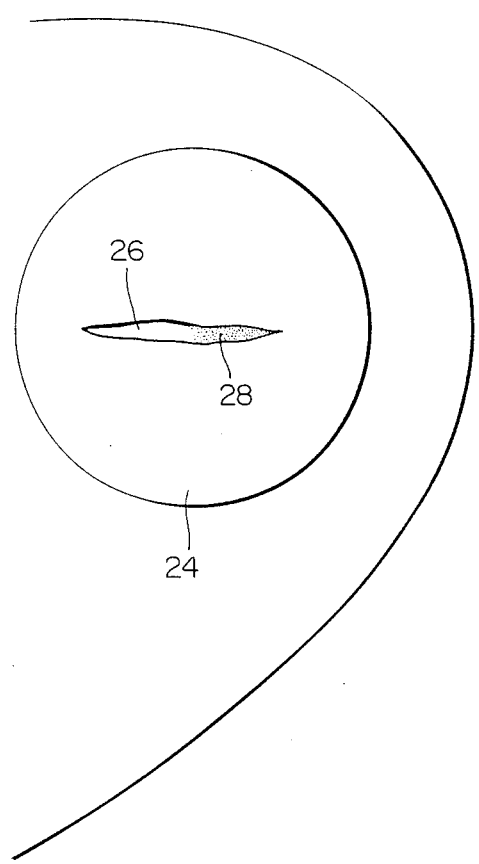
FIG. 4 shows schematically an unfired green body of $Al_2O_3$ with a crack that has been partially repaired using a wet undried gel paste of $Al_2O_3$.

A test specimen 22, see FIG. 3, composed of $Al_2O_3$ containing SiC reinforcement as described in the copending applications was fired to 600° C. Thereafter, it was pulled apart and rejoined following the procedure described with reference to FIG. 1. A good joint resulted.

A disk of unfired dried $Al_2O_3$ containing SiC reinforcement was made according to the procedures described in the copending applications. When dried, the disk 24 (approximately 3" in diameter and $\frac{1}{8}$" thick) had a crack 26 completely through it that extended about $1\frac{1}{2}$", see FIG. 3. The crack 26 was partially repaired using the paste described with reference to FIG. 1. First, a quantity of paste was loaded into a syringe and then injected into one end of crack 26 at the sharp tip and the surrounding area by injecting into the side walls of the crack 26. Next, using a spatula, the opening of the crack was filled in as shown by reference number 28. The disk 24 was then heated above 30° C. to dry the paste. A good repair resulted with the crack tip completely blunted to prevent propagation.

Having now fully described the invention, it will be apparent to one of ordinary skill in the art, that changes and modifications are possible which do not depart from the spirit and scope of the invention as set forth herein.

What is claimed is:

1. A method for joining portions of fired or unfired metal oxide containing ceramic bodies, comprising preparing a wet undried metal oxide gel from an alkoxide of a metal in said metal oxide containing ceramic bodies; applying a paste comprising said wet undried metal oxide gel to a portion of at least one of the ceramic bodies to be joined; contacting the portion of the ceramic body to which said paste was applied with a portion of the other ceramic body and drying the paste.

2. The method of claim 1 wherein the paste further comprises a reinforcement material.

3. The method of claim 1, wherein the ceramic bodies comprise the same metal oxide composition as the paste.

4. The method of claim 1, wherein the ceramic bodies are in the form of dried gels.

* * * * *